United States Patent [19]
Hougen

[11] Patent Number: 5,094,573
[45] Date of Patent: Mar. 10, 1992

[54] MULTIDIRECTIONAL CUTTING TOOL

[76] Inventor: Everett D. Hougen, 5463 Sugar Bush La., Flint, Mich. 48532

[21] Appl. No.: 222,604

[22] Filed: Jul. 21, 1988

[51] Int. Cl.$^5$ .............................. B23C 5/02
[52] U.S. Cl. ........................... 409/132; 407/53; 407/59; 408/203.5; 408/703
[58] Field of Search .............. 409/131, 132; 407/34, 407/53, 54, 59, 62, 63; 144/219; 408/21, 203.5, 230, 204, 205, 206, 703; 76/108 R, 108 T

[56] References Cited

U.S. PATENT DOCUMENTS

| | | | |
|---|---|---|---|
| 887,992 | 5/1908 | Wonderly | 408/203.5 X |
| 1,253,015 | 1/1918 | Driscoll | 408/203.5 X |
| 1,296,536 | 3/1919 | Leech | 407/11 |
| 1,424,392 | 8/1922 | Baker et al. | 408/203.5 |
| 2,557,751 | 6/1951 | Melzer | 407/53 |
| 3,715,788 | 2/1973 | Ayer | 407/63 X |
| 3,811,163 | 5/1974 | Frederick et al. | 407/11 |
| 4,322,189 | 3/1982 | Briese | 407/11 X |
| 4,357,122 | 11/1982 | Hollis, Jr. et al. | 407/63 X |
| 4,461,195 | 7/1984 | Barnick | 408/203.5 |

Primary Examiner—Z. R. Bilinsky
Attorney, Agent, or Firm—Dykema Gossett

[57] ABSTRACT

A cutting tool and method for cutting multidirectional cuts in a workpiece. The cutting tool has a body portion having a generally cylindrical outer wall and inner periphery. A plurality of cutting teeth are spaced circumferentially around the lower end and a plurality of flutes extend upwardly around the outer periphery from the lower end. The cutting teeth include a plurality of generally radially extending cutting edges positioned about the face of the cutting tool, a plurality of inside diameter cutting edges formed at the line of intersection of the radially extending cutting edges and the inner periphery of the cylindrical wall, and a plurality of outside diameter cutting edges formed at the line of intersection of the radially extending cutting edges and the outer periphery of the cylindrical wall. The method includes the ability to move the cutting tool in a direction coincident to the axis of rotation of the cutting tool and at angles to the rotational axis of the cutting tool, either sequentially or simultaneously to obtain cuts with complex contours with each of the directions of cutting having generally the same cutting capacity.

58 Claims, 2 Drawing Sheets

MULTIDIRECTIONAL CUTTING TOOL

BACKGROUND OF THE INVENTION

The present invention relates to cutting tools for cutting a workpiece and methods of cutting a workpiece in multiple directions with substantially equal cutting capacity in all cutting directions. The cutting tool and method of the present invention are ideally suited for complex cutting operations, requiring either sequential or simultaneous cutting in at least two axes.

Due to advances in cutting machine technology, such as for example computer numerical controlled machines or CNC machines, a need has arisen for advanced cutting tools capable of complex metal removal operations in multiple directions. Multiple directional cutting may take many forms, as for example, forming a slot in a workpiece with an axial cut followed by a lateral cut. To cut a ramp into a workpiece, simultaneous metal removal along at least two axes is required, etc. All of these cutting possibilities require a combination of known cutting methods to accomplish the finished cut. For example, the forming of a slot requires drilling to a predetermined depth and then milling laterally from the drilled hole.

As is well known, there are a variety of cutting tools available for making the individual cuts that when combined result in complex cuts. Typically, the above example of a slot is formed by drilling into the workpiece with a drill bit or a hole cutter and then inserting an end mill into the hole formed to make the laterally extending slot.

There are numerous examples of hole cutters, drills and milling cutters for making these individual cuts. The inventor of the present invention is a leading innovator in cutting tool technology with numerous patents relating to cutting tools for cutting holes in a workpiece. Other examples of some of his cutting tools are found in U.S. Pat. Nos. 3,765,789; 3,860,354; U.S. Pat. Nos. Re. 28,416; U.S. Pat. Nos. 4,322,187; 4,452,554; 4,538,944; and 4,632,610. All of these cutting tools have met with considerable success in the United States and abroad for use in forming a hole in a workpiece. Examples of recent developments in drill bits for use in forming holes can be found in U.S. Pat. Nos. 4,687,388, issued to Yokota et al., and 4,373,839, issued to Negishi et al. An example of an end mill for milling a slot can be found in U.S. Pat. No. 2,129,417 issued to Gase.

The problem with the above cutting tools in complex cutting operations is their inability to cut along multiple axes either sequentially or simultaneously. They are designed to cut along a single axis, not along multiple axes. Typically, they cannot be used to cut a ramp because of their single axis capability. Further, to cut a slot, the hole cutter or drill would have to be removed from the hole after the hole is formed and replaced with an end mill to complete the slot. Although this is a common method of forming slots, it is time consuming to change these tools. The necessity of having to change tools when a new axis is selected greatly hinders the performance capabilities of the CNC machine.

There have been attempts to develop cutters that can cut in multiple directions. U.S. Pat. No. 4,265,574 issued to Eckle on May 5, 1981 discloses a combined boring and milling tool having at least three triangularly-shaped turnable cutter blades intended for forming slots or grooves in a workpiece. The cutting blades or edges are mounted at the free end of the cutting tool and at the periphery of the tool. The disclosed tool can be used to first drill to a predetermined depth then, by movement of the tool perpendicular to the first cut, a slot can be milled at full depth.

Although this tool would appear to work as both a drill and an end mill, there are several disadvantages. First, the cutting tool of Eckle only has one cutting edge cutting each path through the workpiece. This results in a slow cutting feed rate. Second, the cutting edge on the face of the Eckle tool extends from the outer periphery of the tool past the axis of rotation of the tool. As will be understood, as the cutting edge approaches the center or rotational axis of the tool, the speed of the cutting edge approaches zero. At the center of the tool, the cutting speed is zero which is commonly referred to as the "dead spot." At the dead spot, due to the cutting speed being zero, the cutter does not cut the material but cold forms it, which consumes excessive horsepower, creates excessive tool pressures, and inhibits the rate at which the tool can axially penetrate the material.

A further attempt to provide a multidirectional cutting tool is disclosed in Allaire et al., U.S. Pat. No. 4,618,296, issued Oct. 21, 1986. Allaire et al. discloses a cutting tool capable of omni-directional machining of a workpiece. The cutting tool is a ball-nosed end mill with a cylindrical shape terminating in a spherically-shaped cutting end with recesses shaped for receipt of at least two indexable cutting inserts. Each insert is mounted in a "lay-down fashion" to provide a portion of an effective overall arcuate cutting edge. The cutting zones of each insert have the form of an equilateral polygon bounded by planar flanks with each flank intersecting a convex portion of a major face of an insert to form an arcuate cutting edge. The convex major face portion forms the clearance face and the planar flank portion forms the rake face for each associated arcuate cutting edge.

The Allaire et al. cutting tool has several disadvantages. It would appear that the Allaire et al. cutting tool is capable of drilling or boring; however, it is extremely limited as to the depth of penetration due to the placement of the cutting inserts 11 and 12. Further, Allaire et al. suffers the same dead spot problem as Eckle discussed above. As best illustrated in FIG. 2 of the Allaire et al. patent, the cutting edge 10 extends to the axis of rotation of the cutter defining a center dead spot. As with Eckle, this consumes horsepower and creates excessive tool pressures which inhibit the rate at which the tool can axially penetrate the workpiece. Also, Allaire et al. has only one cutting edge for cutting each path similar to Eckle. Still further, the Allaire et al. tool has no advantages in end cutting over state-of-the-art standard center cutting end mills. In fact, Allaire et al. may be less efficient due to the high cutting angles near full diameter of the cutter and the lack of chip passages.

Kondo et al., U.S. Pat. No. 4,564,321, issued Jan. 14, 1986, discloses an end-milling cutter with drilling capability. The Kondo et al. cutter has replaceable inserts for the cutting edges and is capable of cutting holes at greater depths. The end mill carries at least two peripheral-cutting inserts for peripheral milling, an inner drilling insert for cutting a radially inward portion of a hole, and an outer drilling insert for cutting a radially outward portion of the hole. The Kondo et al. cutter also includes flutes with the peripheral-cutting inserts disposed in a staggered manner alternately in the first and second flute surfaces. Further, Kondo et al. has an oil passage 11 formed through radially central portions of the body and shank. The oil passage 11, which is a channel for introducing coolant, is open at the end of the end mill 2 to direct the coolant flow to the end of body 4.

However, as with the previously discussed cutters, the Kondo et al. cutting tool has only one edge cutting each path. Again, this slows the cutting capability. The face cutting edge 26 of Kondo et al. extends to the axis of rotation of the cutting tool which creates a dead spot with the same disadvantages discussed above. In view of these difficulties, although the tool should work as both a drill and an end mill, both capacities are limited.

What is needed is a cutting tool which can cut in multiple directions, either sequentially or simultaneously, with equal cutting capacity in all directions, so that there is substantially equal metal removal efficiency in all directions. Also, a cutting tool is needed which has multiple cutting edges that cut the same path for both end-cutting and side-cutting, as opposed to one cutting a edge cutting a single path as found in the above cutters. Further, a cutting tool is needed which does not have a dead spot and which has a coolant passage for supplying coolant to the cutting edges to dissipate generated heat.

SUMMARY OF THE INVENTION

The cutting tool of the present invention overcomes the above-described disadvantages by providing a multidirectional cutting tool capable of cutting with substantially equal capacity in any cutting direction. This invention represents the first and only tool which has equal metal removal efficiency in all cutting directions.

The cutting tool of this invention includes a body portion having a generally cylindrical wall with outer and inner peripheries provided with a plurality of cutting teeth spaced circumferentially around the lower end thereof and along the outer periphery. Further, in the preferred embodiment, the cutting tool includes a plurality of flutes extending upwardly around the outer periphery from the lower end.

The cutting teeth of the preferred embodiment of this invention have generally radially extending cutting edges extending outwardly from the inner periphery of the cylindrical wall. A plurality of inside diameter cutting edges are formed at the line of intersection of the rake face of the radially extending cutting edges and the inner periphery of the cylindrical wall. The inside diameter cutting edges are defined by relieving the inner periphery of the cylindrical wall circumferentially rearwardly from the line of intersection. A plurality of outside diameter cutting edges are formed along the outside periphery at the line of the intersection of the radially extending cutting edges and the outside periphery of the cylindrical wall.

In forming a complex cut, the radially extending cutting edges of the plurality of teeth cut a circular groove into the workpiece with a stem of material remaining on the workpiece and extending into the cutter body as the cutter is rotated and moved along an axis coincident to the rotational or longitudinal axis of the cutter. The inside diameter cutting edges cut into this stem of material and the outside diameter cutting edges remove material from the workpiece as the cutter is moved along an axis non-parallel to the longitudinal axis of the cutter. In this way, the cutting tool is capable of drilling axially into the workpiece, cutting laterally through the workpiece and angularly cutting into the workpiece, either sequentially or simultaneously to form complex cuts.

Because the inside cutting edges do not extend to the center line of the cutter, but rather produce a stem when boring or drilling into the workpiece, there is no dead spot to consume horsepower and create excessive tool pressures. Further, the plurality of generally radially extending cutting edges, the plurality of inside diameter cutting edges and the plurality of outside diameter cutting edges are all cutting the same path allowing greater feed rates to be obtained. A further advantage of this cutting tool is the ability of the inner periphery or center hole to receive the stem formed when the cutting tool is rotated and moved along an axis coincident to the rotational axis of the cutter.

In the preferred embodiment of the invention, at least one of the cutting teeth and more preferably all of the cutting teeth have at least two radially extending cutting edges thereon staggered circumferentially and axially. One of the radially extending cutting edges extends outwardly from the inner periphery of the cylindrical wall and the other cutting edge extends inwardly from the outer periphery of the cylindrical wall. The inside diameter cutting edge is formed at the line of intersection of the rake face of the first radially extending cutting edge and the inner periphery of the cylindrical wall with the outside diameter cutting edges being formed along the line of intersection of the second radially extending cutting edge and the outer periphery of the cylindrical wall. The radially extending cutting edges are staggered circumferentially and axially to provide better axial cutting ability when drilling or boring into the work surface. These cutting edges split the path which each cutting tooth is cutting to facilitate the unobstructed discharge of chips from the hole and provide a hole with a better finish.

In addition to the cutting tool, the present invention includes a method for cutting a workpiece with a rotating drill with substantially equal cutting capacities in all cutting directions. The method comprises the step of locating and aligning a cutter adjacent a workpiece with the cutter having a generally cylindrical sidewall and a plurality of cutting teeth spaced circumferentially around the lower end thereof, a plurality of flutes extending from the lower end around the outer periphery of the sidewall and means for mounting the cutter to a power means. The next step is to simultaneously rotate and axially move the cutter at a first predetermined angle into the workpiece cutting a circular groove from the workpiece and forming a stem of material extending from the workpiece into the bore of the cutter. Simultaneous rotation and axial movement is continued with the cutter cutting into the stem at a second predetermined angle which is not parallel to the first predetermined angle. Thereafter, the cutting tool continues to cut into the workpiece until the cut is completed. This method permits multidirectional cutting of the workpiece.

Other advantages and meritorious features of the present invention will be more fully understood from the following description of the invention, the appended claims, and the drawings, a brief description of which follows.

DETAILED DESCRIPTION OF THE PREFERRED EMBODIMENT

Figure 1:
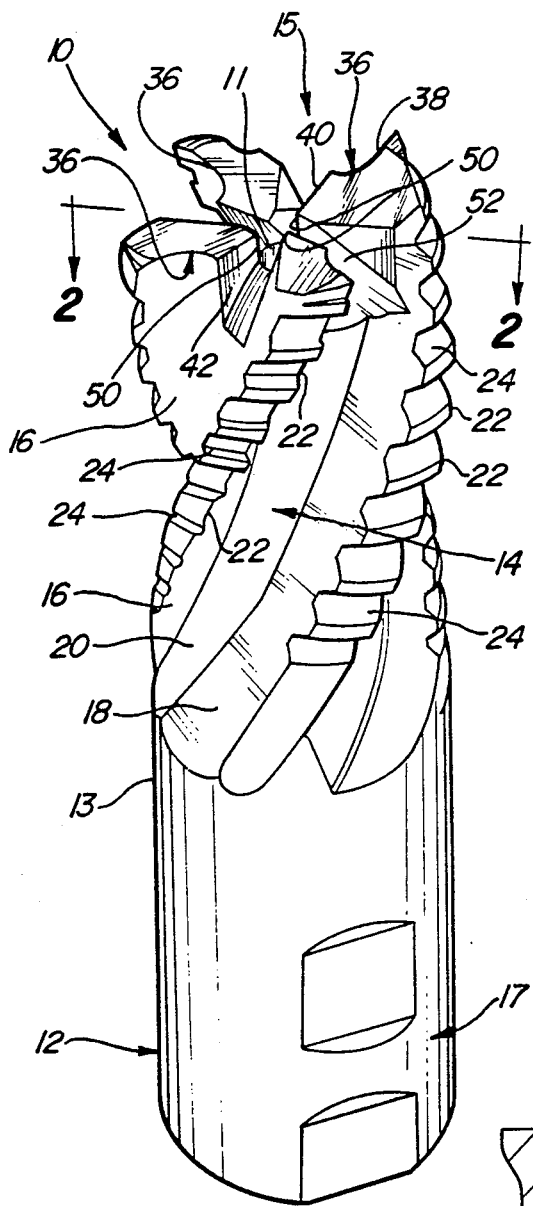
FIG. 1 is a perspective view of the multidirectional cutter of the present invention.

With reference to FIG. 1, the multidirectional cutting tool of the present invention is shown generally at 10. Tool 10 includes a body portion 12 which has a cylindrical outer periphery 13 and a cylindrical inner periphery 11. In the disclosed embodiment, inner periphery 11 extends completely through the cutting tool so that cooling fluid can be supplied to the cutting edges to dissipate generated heat during the cutting process. However, the inner periphery does not have to extend completely through the tool to accomplish multidirectional cutting. The inner periphery 11 will be discussed in greater detail below.

Axially extending spiraled flutes 14 extend from the face or bottom of the cutter 15 in the direction of the shank or top of the cutter 17. As should be apparent, the shank 17 is configured for mounting in a machine for rotating the cutting tool and moving the cutting tool along a single axis or plurality of axes. The flutes 14 are defined by a leading wall 16, a trailing wall 18 and a bottom wall 20.

Flutes 14 form an unobstructed path for the discharge of chips formed during the cutting process. The unimpeded discharge of the chips is extremely important to cutter efficiency. Experience has shown that the life and efficiency of a cutter (i.e., the ease and the number of times in which it can cut holes in metal workpieces and the finish produced by the cutter in the metal workpiece) is to a very large extent dependent upon the ability of the cutter to discharge the cut materials or chips through its flutes or discharge passages. When the chips formed by a cutting tool cannot move freely away from the cutting edges or the flutes become packed or clogged with chips, the torque and thrust required to feed the cutter increases, the cutter wears more rapidly and the finish of the hole deteriorates. This is due primarily to the chips congesting between the cutting edges and the workpiece, creating excessive frictional build-up which results in cutting edge abrasion and damage to the side wall of the hole being cut. As will be more fully described below, the multidirectional cutting tool 10 of the present invention cuts chips in multiple directions, and these must be easily discharged from the cutting tool. The cutting edges of tool 10 are at its face 15, its inner periphery 11, and along its outer periphery 13. Each of these cutting edges cut chips which if not discharged will interfere with the cutting ability of the tool 10. Therefore, the use of flutes 14 is important to the overall efficiency of the tool.

In conjunction with flutes 14, outside cutting edges 22 are formed at the intersection of the outer periphery of body 12 and the trailing wall 16 of each flute 14, with the trailing wall 16 forming the tooth face of edges 22.

Cutting edges 22 extend from the face 15 of the cutting tool in the direction of shank 17. In the preferred embodiment, the radial rake angle, that is the angle in degrees that the tooth face deviates from a radial line to the cutting edge, is approximately 12 degrees to 22 degrees. The preferred radial relief, that is the angle in degrees between a line tangent to the cutting edge and a line tangent to the surface of the outer periphery immediately behind the cutting edge, is approximately 10 degrees to 15 degrees. The preferred helix angle is approximately 20 degrees to 40 degrees. As should be understood, the number of cutting edges 22 and the rake, relief and helix angles may vary depending upon the application of tool 10. The above embodiment of cutting tool 10 has been found preferable when the application is cutting aluminum or other soft metal.

The outside cutting edges 22 cut into the work surface as the cutting tool is moved in a direction which is not parallel to the axis of rotation of the cutting tool. When the cutting tool is moved in this non-parallel direction, edges 22 perform a milling function and form chips which are directed into the adjacent flutes 14 and discharged away from the cutting edges in the direction of shank 17. To reduce the size of the chips formed, grooves 24 may be cut into the outside diameter 13 to break up the chips before they are directed into flutes 14. In the disclosed embodiment, the grooves 24 are axially spaced and staggered along the outer periphery of cutter body 12 and extend from the leading wall 16 to the trailing wall 18 of flutes 14.

At the face end 15 of cutting tool 10, radial cutting teeth 36 are formed. In the disclosed embodiment, there are four radial cutting teeth 36 which radially extend from the inner periphery 11 of the cutting tool 10 to the outer periphery 13. Further, in the disclosed embodiment, the radial cutting teeth 36 have an outer radial cutting edge 38 and an inner radial cutting edge 40 which are axially and circumferentially spaced from one another with the inner cutting edge 40 spaced circumferentially ahead of the outer cutting edge 38 in the direction of rotation of the cutting tool 10. Leading wall 16 forms the cutting face of outer cutting edge 38 at a preferred axial rake angle of approximately 20 degrees to 40 degrees and an axial relief angle of approximately 6 degrees to 12 degrees. The face of inner radial cutting edge 40 is defined by a gullet 42 formed in the web portion 43 of the cutter between the inner periphery 11 and the bottom wall 20 of flute 14. Preferably, the axial rake angle of inner radial cutting edge 40 is approximately 0 degrees to 15 degrees, and the axial relief angle is approximately 6 degrees to 12 degrees. As should be understood, the radial cutting teeth 36 may vary in number, may have one or more cutting edges, and may have different rake and relief angles depending upon the application of tool 10. The above embodiment of the cutting tool 10 has been found preferable when the application is cutting aluminum or other soft metal.

Additionally, in the preferred embodiment, the outer radial cutting edge 38 is relieved at 44. This relief 44 is added to alleviate excess pressures on the corner which would normally be concentrated at the intersection of the outer radial cutting edge 38 and the periphery of body portion 12. If this portion is not relieved, excessive pressures act upon the corner and tend to chip this corner, interfering with efficient cutting action. Therefore, to prevent chipping, the corner is relieved, eliminating this corner and the excess pressures encountered. Still further, in the preferred embodiment, the radial cutting teeth are angled radially outwardly and in the direction away from face 15 from the inner periphery toward the outer periphery.

Figure 3:
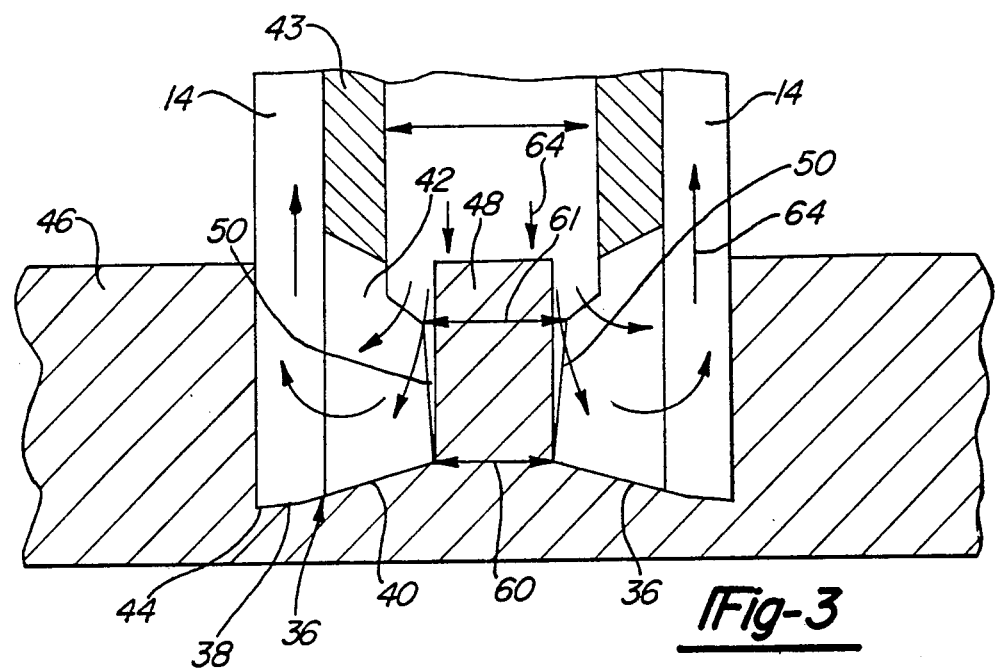
FIG. 3 is a cross-sectional view of the cutting tool of the present invention cutting into a workpiece.

The radial cutting teeth 36 cut the workpiece when the cutting tool 10 is moved in a direction coincident to the axis of rotation. In other words, the radial cutting teeth 36 perform the drilling or boring function of cutting tool 10. With reference to FIG. 3, the radial cutting teeth 36 are illustrated cutting into a workpiece 46. As should be apparent, a stem 48 extends from the workpiece into the inner periphery of the cutting tool 10 due to inner periphery 11. This stem 48 is formed because the radial cutting teeth 38 extend from the inner periphery to the outer periphery and do not extend to the rotational axis of the cutter. Therefore, there is no dead spot in the cutting tool of this invention.

Figure 2:
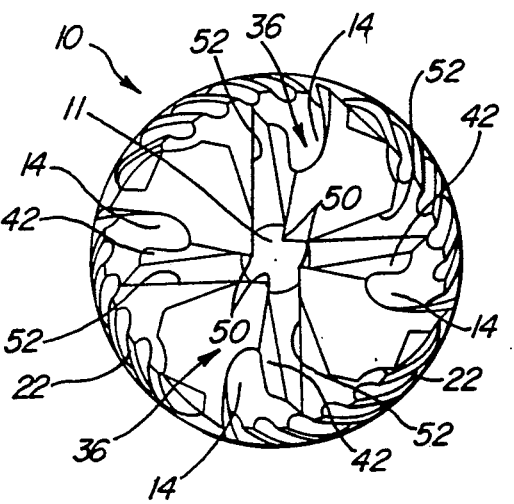
FIG. 2 is a planar view of the end face of the multidirectional cutter of the present invention taken along line 2—2 of FIG. 1.

With reference to FIGS. 1, 2 and 3, inside diameter cutting edges 50 will now be described. Cutting edges 50 are formed at the intersection of the rake face of inner radial cutting edge 40 and the inner periphery 11 of cutting tool 10. The inside diameter cutting edge 50 is defined by gullet 42 and a wall 52 formed by relieving the inner periphery 11 of cutting tool 10. In the disclosed embodiment, the radial rake angle of edge 50 is approximately −6 degrees to 10 degrees, with the most preferred being 0 degrees to 10 degrees. It should be understood that the most preferred rake angle may be commercially difficult to achieve due to manufacturing limitations. In the preferred embodiment, the radial relief angle is 5 degrees to 14 degrees. Again, as should be understood, the number of cutting edges 50 and the rake and relief angles may vary depending upon the application. In the preferred embodiment, the tool is being used to cut into soft metal such as aluminum. In this preferred embodiment, there are four cutting edges 50, one on each radial cutting tooth 36.

With reference to FIG. 3, the preferred embodiment of inside diameter cutting edges 50 and inner periphery 11 is illustrated. In this embodiment, the inside cutting edges 50 diverge from the axis of rotation in a direction away from face 15. Due to this divergence, the edges 50 are spaced from one another at a first diameter 60 at face 15 which progressively increases to a second diameter 61 at the opposite end of edges 50. As can be seen, this divergence of cutting edges 50 leaves a space between edges 50 and stem 48 for the greater part of the axial length of edge 50. This space permits cooling fluid to be forced in between edges 15 and stem 48. Also, this divergence permits slight undercutting of stem 48 when the cutting tool 10 is moved in a direction which is not parallel to the axis of rotation of the cutting tool 10. See FIGS. 4, 5 and 6.

At diameter 61, the cutting edge is relieved to a second diameter 62 of inner periphery 11. As is apparent, diameter 62 is greater than diameters 61 and 60. This second inner periphery diameter 62 has three important functions in the cutting tool 10 of the present invention. First, the second diameter 62 of inner periphery 11 freely accepts stem 48 without any interference with the cutting tool 10 during the drilling process. Second, the greater diameter 62 permits cooling fluid shown generally by arrows 64 to be supplied to the cutting teeth to lubricate and dissipate generated heat. Of course, this is optional and, if cutting fluid is not used, the inner periphery 11 would not have to extend the full length of cutter 10. Cutting fluid 64 flows past the relieved portion of edges 50, through the intersecting gullet 42, past the cutting edges and is discharged through flutes 14. Further, this flow of cooling fluid 64 helps to discharge chips generated during the cutting process. Third, the greater diameter 62 of second periphery 11 permits the cutting tool 10 to move laterally or at an angle not parallel to the axis of rotation of the cutting tool 10 after the tool 10 has drilled or bored to a depth greater than the axial length of the inside cutting edges. The second diameter 62 provides enough clearance space for the inside cutting edges to cut completely through the stem or at least sufficiently through the stem so that the stem will break from the work surface 46.

Although the above describes the preferred embodiment of the inner periphery 11 and inside diameter cutting edge 50 when used to cut soft metal, there are further embodiments. As for example, diameter 62 may equal diameter 61. This provides space for cooling fluid 64 to reach the cutting edges and for a break line to be cut into stem 48. As should be apparent, in this embodiment the stem 48 contacts the wall of periphery 11 sooner, and stem 48 is broken from work surface 46 rather than being cut from the work surface. Further, if the tool is used primarily for ramping, a clearance space between stem 48 and the wall of inner periphery 11 is not required. Alternative embodiments of the cutting edge 50 include an axially straight cutting edge which does not diverge from the axis of rotation or an edge 50 which converges with respect to the axis of rotation rather than diverging.

Figure 4:
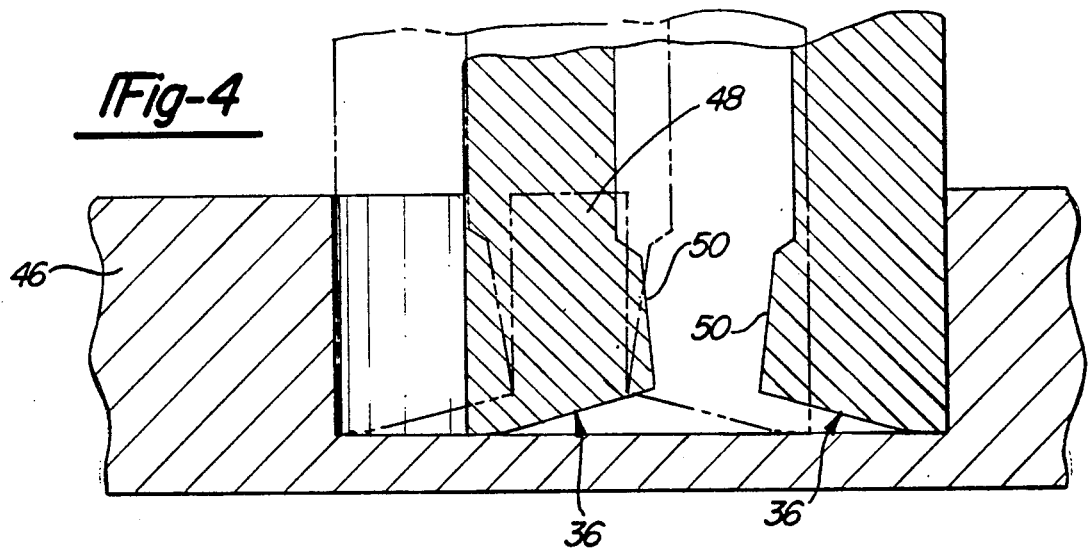
FIG. 4 is a cross-sectional view of the cutting tool of the present invention cutting into a workpiece and then moving laterally to the axis of rotation of the cutter.

With reference to FIG. 4, the cutting action of the outside diameter cutting edges 22 and inside diameter cutting edges 50 will be more fully understood. FIG. 4 illustrates the lateral cutting ability of tool 10 once it has drilled or bored into the work surface 46. The phantom lines in FIG. 4 show the cutter as positioned in FIG. 3. The solid lines illustrate the cutter after it has moved to the right, as viewed in FIG. 4. As should be apparent, this cutting action along two axes will form a slot in workpiece 46.

The method of cutting this slot is to first bore or drill into the work surface 46, as shown in FIG. 3, and then after a predetermined depth has been reached, laterally move the hole cutter to the right. As cutting edge 50 cuts into slug 48, the bottom portion of slug 48 will be cut away with the chips flowing into gullet 42 and out flutes 14. Simultaneously, outside diameter cutting edges 22 cut into the workpiece 46 with the chips being discharged through flutes 14. As should be apparent, in the disclosed embodiment, stem 48 will rub against the wall of the inner periphery 11 before it is completely cut from workpiece 46. As the cutter continues to move to the right, stem 48 is broken along the line, made by edges 50, from workpiece 46 with edges 50 removing any remaining portions of stem 48 left on the workpiece. Depending upon the material being cut, the diameter 62 may have to be increased so that more of the stem 48 is cut so that it will break from workpiece 46 or be completely cut from workpiece 46 by edges 50.

Figure 6:
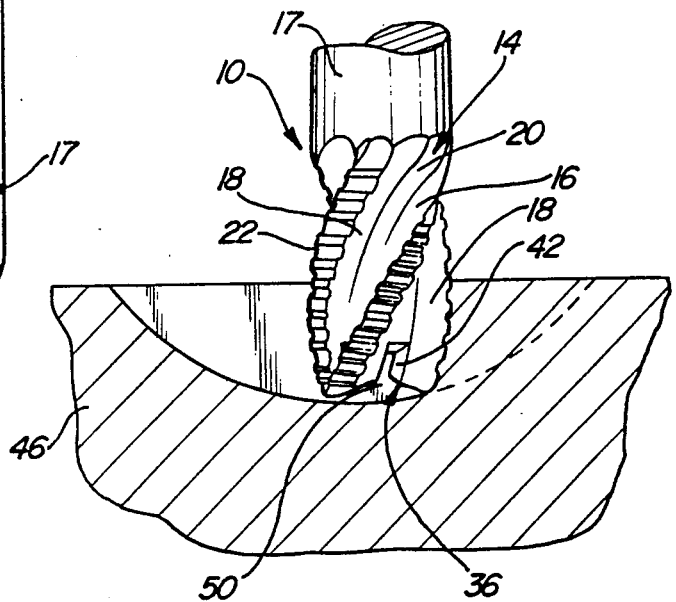
FIG. 6 is a cross-sectional view of a workpiece with the cutting tool of the present invention cutting an arcuate slot into a workpiece.
Figure 5:
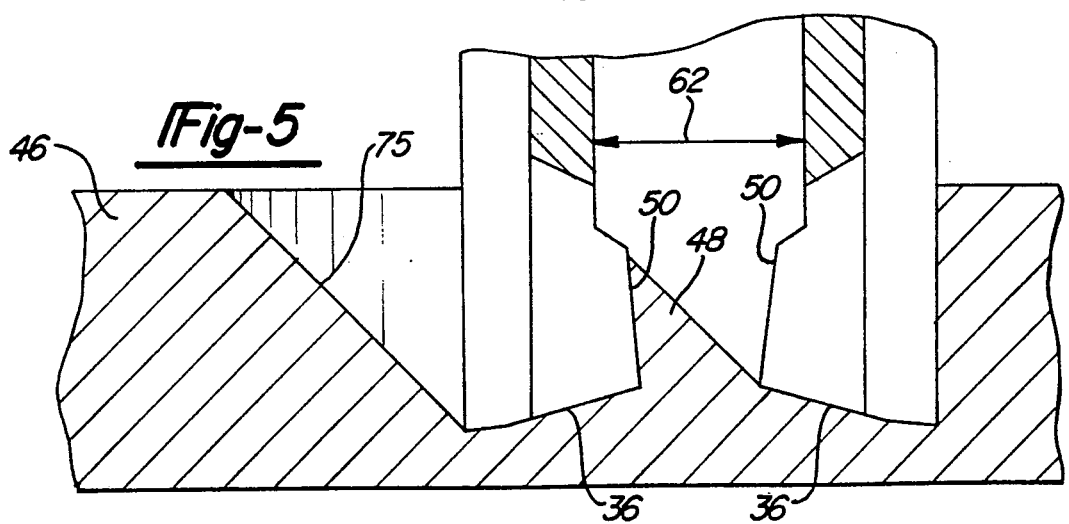
FIG. 5 is a cross-sectional view of the cutting tool of the present invention ramp cutting into a workpiece.

With reference to FIG. 5, a further cutting capability of the cutting tool 10 of the present invention is illustrated. FIG. 5 illustrates ramping whereby a slot having an inclined bottom surface 75 is formed. The method of cutting the ramp of FIG. 5 is by simultaneously boring or drilling into the workpiece while moving the cutting tool 10 to the right as viewed in FIG. 5. This simultaneous cutting along at least two axes produces the inclined surface 75. With reference to FIG. 6, a still further cutting capability of the cutting tool 10 of the present invention is illustrated. In FIG. 6, the bottom surface 77 of the cut is arcuate. As should be understood, any number of complex cuts can be performed along multiple directions with the cutting tool 10 of the present invention.

Each of the various cutting capabilities illustrated in FIGS. 4, 5 and 6, as well as any number of other cutting capabilities are typically performed by a common method. The method of cutting a workpiece 46 with cutting tool 10, such that there is substantial equal cutting capacity in each cutting direction, involves the steps of first locating and aligning the cutting tool 10 adjacent the workpiece 46, then cutting a circular groove with the radially extending cutting teeth as the cutting tool is moved in an axial direction coincident to the longitudinal axis of cutter 10. A central stem 48 remains on the workpiece and projects into the inner periphery 11 of cutting tool 10. Thereafter, or simultaneously with the above step, the outside diameter cutting edges 22 cut into the workpiece 46 as the cutter is moved in a direction non-parallel to the rotational axis of the cutter with the inside diameter cutting edges 50 cutting into the stem. As the cutter 10 is continually moved in a direction non-parallel to its rotational axis, the inside diameter cutting edges 50 will either cut through stem 48 or cut a break line along which stem 48 breaks from workpiece 46. These steps are continued until the cut in the workpiece is completed. As should be apparent, this method permits multidirectional cutting of the workpiece by permitting complex cuts along multiple axes such as for example slots having flat, angled and curved bottoms as well as combinations of these and different geometric shapes to be cut.

While the preferred embodiments of the present invention have been described so as to enable one skilled in the art to practice the techniques of the present invention, the preceding description is intended to be exemplary and should not be used to limit the scope of the invention. For example, the cutting edges could be replaced by cutting inserts rather than grinding the cutting surfaces from a cylindrical wall as disclosed in the preferred embodiment. Further, extending the inner periphery or bore through the cutter is not necessary. Other types of coolant could be used, or coolant could be introduced in any number of known ways rather than forcing the coolant through the inner periphery of the cutter. In view of the foregoing, it should be understood that the scope of the invention should be determined only by reference to the following claims.

I claim:

1. A cutting tool for multidirectional cutting of a workpiece, said cutting tool comprising:
   a body portion having a generally cylindrical wall with an outer and inner periphery provided with a plurality of cutting teeth spaced circumferentially around the lower end thereof and a plurality of flutes extending upwardly around said outer periphery from said lower end;
   said cutting teeth having generally radially extending cutting edges extending outwardly from said inner periphery of said cylindrical wall;
   at least one of said cutting teeth having at least two radially extending cutting edges thereon staggered circumferentially and axially, the first of said radially extending cutting edges extending outwardly from said inner periphery of said cylindrical wall and the second of said radially extending cutting edges extending inwardly from said outer periphery of said cylindrical wall;
   at least one inside diameter cutting edge extending from said lower end upwardly from the intersection of at least one of said radially extending cutting edges and said inner periphery of said cylindrical wall; and
   a plurality of outside diameter cutting edges formed about said outer periphery of said cylindrical wall;
   whereby said radially extending cutting edges of said plurality of teeth cut a circular groove into said workpiece with a stem of material remaining within said cutter body as the cutter is rotated and moved along an axis coincident to the longitudinal axis of said cutter and with said inside diameter cutting edge cutting into said stem of material and said outside diameter cutting edges removing material from said workpiece as said cutter is moved along an axis non-parallel to the longitudinal axis of said cutter; thereby enabling said cutting tool to drill axially into said workpiece, cut laterally through said workpiece and angularly cut into said workpiece.

2. The cutting tool of claim 1, wherein said outside diameter cutting edges are axially spaced along said outer periphery between said flutes.

3. The cutting tool of claim 1, wherein said cutter includes a plurality of inside diameter cutting edges generally equally spaced radially from the longitudinal axis of said cutting tool.

4. The cutting tool of claim 1, wherein said cutting tool has an inside diameter which increases from said lower end of said cutter in the direction of said upper end of said cutter;
   whereby said inside diameter cutting edges are slightly angled with respect to said longitudinal axis.

5. The cutting tool of claim 1, further including a fluid passage extending through said cutting tool, said passage having a first diameter extending from said lower end to a second diameter, said second diameter being greater than said first diameter for receipt of said stem without interfering with the flow of fluid to said cutting teeth.

6. The cutting tool of claim 1, wherein said inner periphery has a first diameter defined by said inside diameter cutting edges and a second diameter spaced axially from said first diameter, said second diameter being greater than said first diameter and receiving said stem when said cutter is cut to a depth greater than the axial length of said inside diameter cutting edge;
   said inner periphery, at said second diameter, contacting said stem and said inside diameter cutting edge cutting at least partially into said stem to form a break line as said cutter is moved in a direction non-parallel to said axis of rotation of said cutter such that said stem breaks from said workpiece along said break line with the inside diameter cutting edge removing any remaining stem material from said workpiece.

7. A method of cutting a workpiece with a cutter with substantially equal cutting capacity in any cutting direction, said method comprising the steps of:
   1) locating and aligning a cutter adjacent said workpiece, said cutter having a generally cylindrical side wall with a plurality of cutting teeth spaced circumferentially around the lower end thereof including inside cutting edges, a plurality of flutes extending from said lower end around the outer periphery of said side wall and means for mounting said cutter to a power means;

2) simultaneously rotating and axially moving said cutter at a first predetermined angle into said workpiece cutting a circular groove from said workpiece and forming a stem of material extending from said workpiece into the bore of said cutter;

3) simultaneously rotating and axially moving said cutter into said workpiece cutting into said stem at a second predetermined angle of said cutter not parallel to said first predetermined angle;

4) continuing to cut into said workpiece to a depth greater than the axial length of said inside cutting edge;

whereby said method permits multidirectional cutting of said workpiece enabling holes to be drilled, laterally extending cuts to be made; and angled plunge cuts to be made.

8. The method of claim 7, wherein said non-parallel direction of step 3 is substantially perpendicular to said predetermined angle of step 2.

9. The method of claim 7, wherein said non-parallel direction of step 3 is at an angle to said predetermined angle of step 2.

10. The method of claim 7, wherein steps 2 and 3 are performed substantially at the same time forming cuts having an inclined bottom surface.

11. The method of claim 7, wherein steps 2 and 3 are performed substantially simultaneously forming a complex contour cut in said workpiece.

12. The method of claim 7, further including the steps of forcing cooling fluid through a bore extending through said cutter and directing said cooling fluid about said cutting teeth lubricating said teeth and dissipating heat produced by said teeth.

13. The method of claim 7, further including the step of engaging the inner wall of said cutter after said inside diameter cutting edges have at least partially cut into said stem as said cutter is moved in a non-parallel direction with respect to the axis of rotation of said cutting tool to break said stem from said workpiece.

14. A method of cutting a workpiece, comprising the steps of:

1) locating and aligning a cutter tool adjacent said workpiece, said cutter having a generally cylindrical side wall with a plurality of cutting teeth spaced circumferentially around the lower end thereof, said cutting teeth having radially extending cutting edges, inside diameter cutting edges and outside diameter cutting edges, a plurality of flutes extending from said lower end around the outer periphery of said side wall and means for mounting said cutting tool to a power means;

2) cutting a circular groove with a central stem portion remaining on said workpiece and projecting into said cutter tool adjacent said inside diameter cutting edges as said cutting tool is moved in an axial direction coincident to the longitudinal axis of said cutter, said stem having a height between very slight to substantially greater than the length of said inside diameter cutting edges;

3) cutting into said workpiece with said outside diameter cutting edges as said cutter is moved in a direction non-parallel to the longitudinal axis of said cutter with said inside diameter cutting edges cutting into said stem;

4) continuing to cut into said workpiece until said cut is completed.

15. The method of claim 14, wherein said non-parallel direction of step 3 is substantially perpendicular to said direction of step 2.

16. The method of claim 14, wherein said non-parallel direction of step 3 is at an angle to said direction of step 2.

17. The method of claim 14, wherein steps 2 and 3 are performed at substantially the same time forming a cut having an inclined bottom surface.

18. The method of claim 14, wherein steps 2 and 3 are performed substantially simultaneously forming a complex contour cut in said workpiece.

19. The method of claim 14, further including the steps of forcing cooling fluid through a bore extending through said cutting tool and directing said cutting fluid about said cutting teeth dissipating heat produced by said teeth.

20. The method of claim 14, further including the step of cutting said circular groove to a depth greater than the axial length of said inside diameter cutting edge and next performing step 3 with said stem being severed from said workpiece to remain within a bore extending within said cutting tool.

21. The method of claim 14, further including the step of engaging said stem with the inner wall of said cutter after said inside diameter cutting edges have at least partially cut into said stem as said cutter is moved in a non-parallel direction to the axis of rotation of said cutting tool breaking said stem from said workpiece.

22. A cutting tool for multidirectional cutting of a workpiece with substantially equal cutting capacity in all cutting directions; said cutting tool comprising:

a tubular body portion having a generally cylindrical wall with an outer and inner periphery provided with a plurality of cutting teeth spaced circumferentially around the lower end thereof and a plurality of flutes extending upwardly in said outer periphery of said generally cylindrical wall from said lower end;

said cutting teeth having at least two generally radially extending cutting edges thereon staggered circumferentially and axially, the first of said radially extending cutting edges extending outwardly from said inner periphery of said cylindrical wall and the second of said radially extending cutting edges extending inwardly from said outer periphery of said cylindrical wall;

an interior cutting edge extending generally axially from said lower end upwardly from the intersection of said radially extending cutting edge and said inner periphery of said cylindrical wall, said interior cutting edge diverging from the longitudinal axis of said cutting tool;

an exterior cutting edge formed about said outer periphery of said cylindrical wall;

whereby said radially extending cutting edges of said plurality of teeth cut a circular groove into said workpiece with a stem of material remaining within said cutter body as the cutter is rotated and moved along an axis coincident to the rotational axis of said cutter into said workpiece with said interior cutting edge of said cutting teeth cutting into and removing said stem of material from said workpiece and said exterior cutting teeth removing material from said workpiece as said cutter is moved along an axis non-parallel to the rotational axis of said cutter; thereby enabling said cutting tool to drill axially into said workpiece, cut laterally through said workpiece and ramp into said workpiece at an angle.

23. The cutting tool of claim 22, wherein said interior cutting edge is defined by relieving said inner periphery of said cylindrical wall circumferentially rearwardly from a line extending generally axially upwardly from said lower end from said intersection of said at least one generally radially extending cutting edge generally tangential to said inner periphery of said cylindrical wall.

24. The cutting tool of claim 22, wherein said cutter includes a plurality of inside diameter cutting edges generally equally spaced radially from the longitudinal axis of said cutting tool.

25. The cutting tool of claim 22, further including a fluid passage extending through said cutting tool, said passage having a first diameter extending from said lower end to a second diameter, said second diameter being greater than said first diameter for receipt of said stem without interfering with the flow of fluid to said cutting teeth.

26. The cutting tool of claim 22, wherein said inner periphery has a first diameter defined by said inside diameter cutting edges and a second diameter spaced axially from said first diameter, said second diameter being greater than said first diameter and receiving said stem when said cutter is cut to a depth greater than the axial length of said inside diameter cutting edges;
said inner periphery, at said second diameter, contacting said stem and said inside diameter cutting edges cutting at least partially into said stem to form a break line as said cutter is moved in a direction non-parallel to said axis of rotation of said cutter such that said stem breaks from said workpiece along said break line with the inside diameter cutting edges removing any remaining stem material from said workpiece.

27. A multidirectional cutting tool for cutting a workpiece in at least two axes, said cutting tool comprising:
a generally cylindrical body portion having a first end adapted to be received in a power tool for rotating said cutting tool and a cutter end;
said cutter end having in inside diameter, an outside diameter and a plurality of spaced cutting teeth projecting generally axially therefrom;
said cutting teeth each having an inside surface spaced radially from the longitudinal axis of said cylindrical body portion and an outside surface;
said cutting teeth inside surfaces generating a diameter of rotation less than said inside diameter of said cutting end and said cutting teeth outside surfaces generating a diameter of rotation generally equal to said cutting end outside diameter;
said cutting teeth inside surfaces including at least two rotationally spaced inside cutting edges, said cutting teeth outside surfaces including at least two rotationally spaced outside cutting edges and said cutting teeth including at least two rotationally spaced generally radially extending cutting edges;
whereby said generally radially extending cutting edges cut a circular groove in said workpiece leaving a stem extending into said cutter end as said cutting tool is rotated and moved axially into said workpiece and said workpiece stem is removed by said inside cutting edges as said cutting tool is moved laterally.

28. The cutting tool of claim 27, wherein said cutting teeth each have at least two of said generally radially extending cutting edges staggered circumferentially and axially, including a first radial cutting edge extending outwardly from said inner surface and a second radial cutting edge extending inwardly from said outer surface.

29. The cutting tool of claim 27, wherein each of said cutting teeth includes said inside cutting edge and said outside cutting edge.

30. The cutting tool of claim 27, wherein said inside cutting edges are defined by relieving said inside surfaces of said cutting teeth circumferentially rearwardly from a line of intersection of said radially extending cutting edge and said inner periphery.

31. The cutting tool of claim 27, wherein said inside cutting edges are generally equally spaced from the longitudinal axis of said cylindrical body portion.

32. The cutting tool of claim 27, wherein the diameter of said cutting teeth inside surfaces increases from the free end of said cutting teeth to said cutter end, wherein said inside cutting edges are angled with respect to said longitudinal axis.

33. The cutting tool of claim 27, wherein said generally cylindrical body portion is hollow throughout its length providing a cutting fluid passage through said body portion.

34. A multidirectional tool for cutting a workpiece in at least two axes of said tool, said cutting tool comprising:
a generally cylindrical body portion having a first tool-engaging end adapted to be received in a power tool for rotating said cutting tool and a cutter end;
said cutter end having an inside diameter, an outside diameter and a plurality of spaced cutting teeth projecting generally axially from said cutter end;
said plurality of cutting teeth having an inside surface spaced radially from the longitudinal axis of said cylindrical body portion and an outside surface;
said plurality of cutting teeth further having at least two circumferentially spaced inside cutting edges at the leading edge of said inside surface, at least two generally radially extending cutting edges and at least two outside cutting edges at the leading edge of said outside surface, said inside cutting edges having an axial length greater than the minimum diameter of said cutter measured between said inner cutting edges;
whereby said generally radially extending cutting edges cut a circular groove in said workpiece leaving a stem extending into said cutter end as said cutting tool is rotated and moved axially into said workpiece and said workpiece stem is at least partially removed by said inside cutting edges as said cutting tool is moved laterally.

35. The cutting tool of claim 34, wherein said inner cutting edges are defined by relieving said inner periphery of said cutting teeth circumferentially rearwardly from a line of intersection generally tangential to a circle generated by said inside cutting edges.

36. The cutting tool of claim 34, wherein said inside cutting edges are generally equally spaced from said longitudinal axis of said generally cylindrical body portion.

37. The cutting tool of claim 34, wherein each of said cutting teeth inside surfaces include an inside cutting edge at the leading edge of said inside surfaces and said radial cutting edges extend generally transversely to said inside cutting edges.

38. The cutting tool of claim 34, wherein said cutting teeth have an inside diameter which increases from said inside cutting edge to said cutter end, wherein said inside cutting edges are slightly angled with respect to said longitudinal axis.

39. The cutting tool of claim 34, wherein said cutter end includes a plurality of flutes extending upwardly in said outside diameter adjacent said outside cutting edges.

40. A method of cutting a workpiece, comprising the steps of:
1) locating and aligning a cutter tool adjacent said workpiece, said cutter having a generally cylindrical side wall with a plurality of cutting teeth spaced circumferentially around the lower end thereof, said cutting teeth having circumferentially spaced radially extending cutting edges with inside surfaces radially spaced from the axis of rotation of the cutter defining an inner periphery, and outside diameter cutting edges, a plurality of flutes extending from said lower end around the outer periphery of said side wall and means for mounting said cutting tool to a power means;
2) cutting with said radial cutting edges a circular groove with a central stem portion having a diameter less than the axial length of said inside cutting edges remaining on said workpiece and projecting into said inner periphery defined by said radially extending cutting edges as said cutting tool is moved in an axial direction coincident to the axis of rotation of said cutter;
3) cutting into said workpiece with said outside diameter cutting edges as said cutter is moved in a direction non-parallel to the longitudinal axis of said cutter with said inside surfaces removing said stem;
4) continuing to cut into said workpiece until said cut is completed.

41. The method of claim 40, wherein said non-parallel direction of step 3 is substantially perpendicular to said direction of step 2.

42. The method of claim 40, wherein said non-parallel direction of step 3 is at an angle to said direction of step 2.

43. The method of claim 40, wherein steps 2 and 3 are performed at substantially the same time forming a cut having an inclined bottom surface.

44. The method of claim 40, wherein steps 2 and 3 are performed substantially simultaneously forming a complex contour cut in said workpiece.

45. The method of claim 40, further including the steps of forcing cooling fluid through a bore extending through said cutting tool and directing said cutting fluid about said cutting teeth dissipating heat produced by said teeth.

46. The method of claim 40, wherein said inside surfaces include at least one inside diameter cutting edge with said inside diameter cutting edge cutting into said stem in step 3.

47. The method of claim 40, further including the step of cutting said circular groove to a depth greater than the axial length of said inside diameter cutting edge and next performing step 3 with said stem being severed from said workpiece to remain within a bore extending within said cutting tool.

48. The method of claim 40, further including the step of engaging said stem with the inner wall of said cutter after said inside diameter cutting edge has at least partially cut into said stem as said cutter is moved in a non-parallel direction to the axis of rotation of said cutting tool breaking said stem from said workpiece.

49. An annular cutting tool having a first end adapted to be mounted into a spindle for rotating said tool and a second end;
said second end having an inside diameter, an outside diameter and a plurality of cutting teeth projecting generally axially therefrom;
said second end further having chip passages formed into the outside diameter which communicate with the said cutting teeth for the purpose of receiving materials cut by the cutting teeth;
said cutting teeth having an inside surface spaced radially from the rotational axis of the tool, a generally radially extending cutting edge and an outside diameter cutting edge;
at least one of said cutting teeth having an inside diameter cutting edge formed onto said inside surface;
said inside cutting edge having an axial length which exceeds the least diameter of rotation of the said at least one inside cutting edge;
and a chip passage formed adjacent said inside cutting edge which leads to one of the chip passages formed into the outside diameter of the tool.

50. The cutting tool of claim 49, wherein the at least one inside diameter cutting edge is parallel to the axis of rotation of the tool.

51. The cutting tool of claim 49, wherein the at least one inside diameter cutting edge is non-parallel to the axis of rotation of the tool.

52. The cutting tool of claim 49, wherein the angle of the at least one inside diameter cutting edge to the rotational axis of the tool is between 45 degrees convergent towards the first end of the tool and 20 degrees divergent towards the first end of the tool.

53. The cutting tool of claim 49, wherein the tool has a coolant passage extending from the inside diameter of the second end of the tool through the first end of the tool.

54. A multidirectional tool for cutting a workpiece in at least two axes of said tool, said cutting tool comprising:
a generally cylindrical body portion having a first tool-engaging end adapted to be received in a power tool for rotating said cutting tool and a cutter end;
said cutter end having an inside diameter, an outside diameter and a plurality of spaced cutting teeth projecting generally axially from said cutter end;
said plurality of cutting teeth each having an inside surface spaced radially from the longitudinal axis of said cylindrical body portion and an outside surface;
said plurality of cutting teeth further having at least two circumferentially spaced inside cutting edges at the leading edge of said inside surface, at least two generally radially extending cutting edges and at least two outside cutting edges at the leading edge of said outside surface;
whereby said generally radially extending cutting edges cut a circular groove in said workpiece leaving a stem extending into said cutter end as said cutting tool is rotated and moved axially into said workpiece and said workpiece stem is at least partially removed by said inside cutting edges as said cutting tool is moved laterally.

55. The cutting tool of claim 54, wherein said inside cutting edges are generally equally spaced from said longitudinal axis of said generally cylindrical body portion.

56. The cutting tool of claim 54, wherein each of said cutting teeth inside surfaces include an inside cutting edge at the leading edge of said inside surfaces and said radial cutting edges extend generally transversely to said inside cutting edges.

57. The cutting tool of claim 54, wherein said cutting teeth have an inside diameter which increases from said inside cutting edge in the direction of said cutter end, wherein said inside cutting edges are slightly angled with respect to said longitudinal axis.

58. The cutting tool of claim 54, wherein said cutter end includes a plurality of flutes extending upwardly in said outside diameter adjacent said outside cutting edges.

* * * * *